Patented Nov. 1, 1938

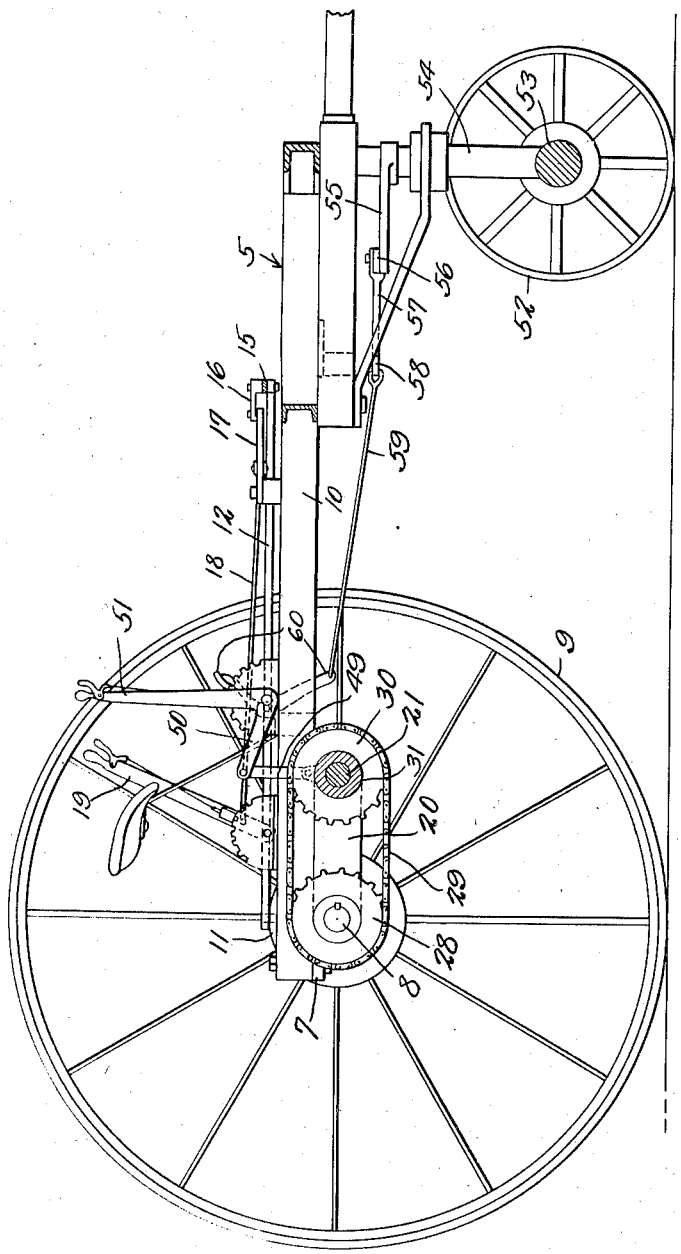

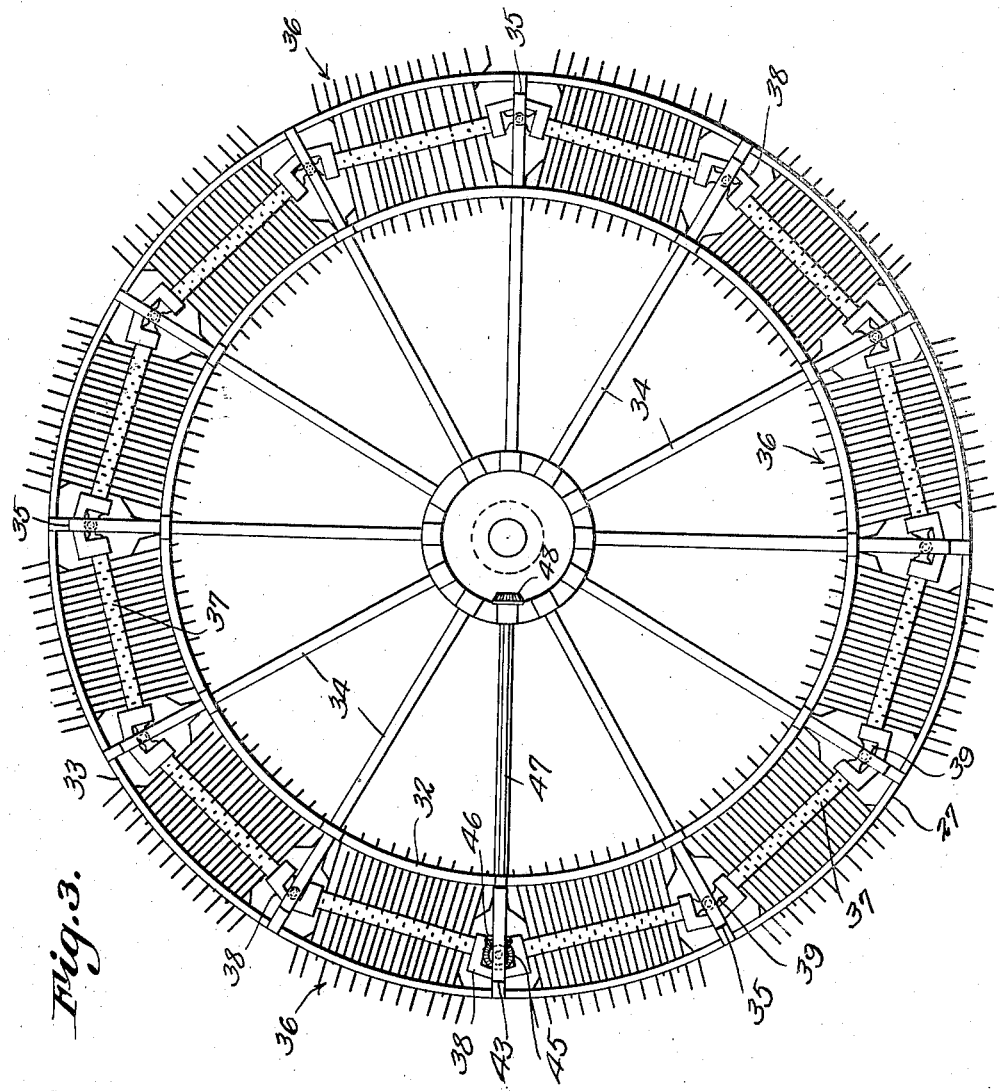

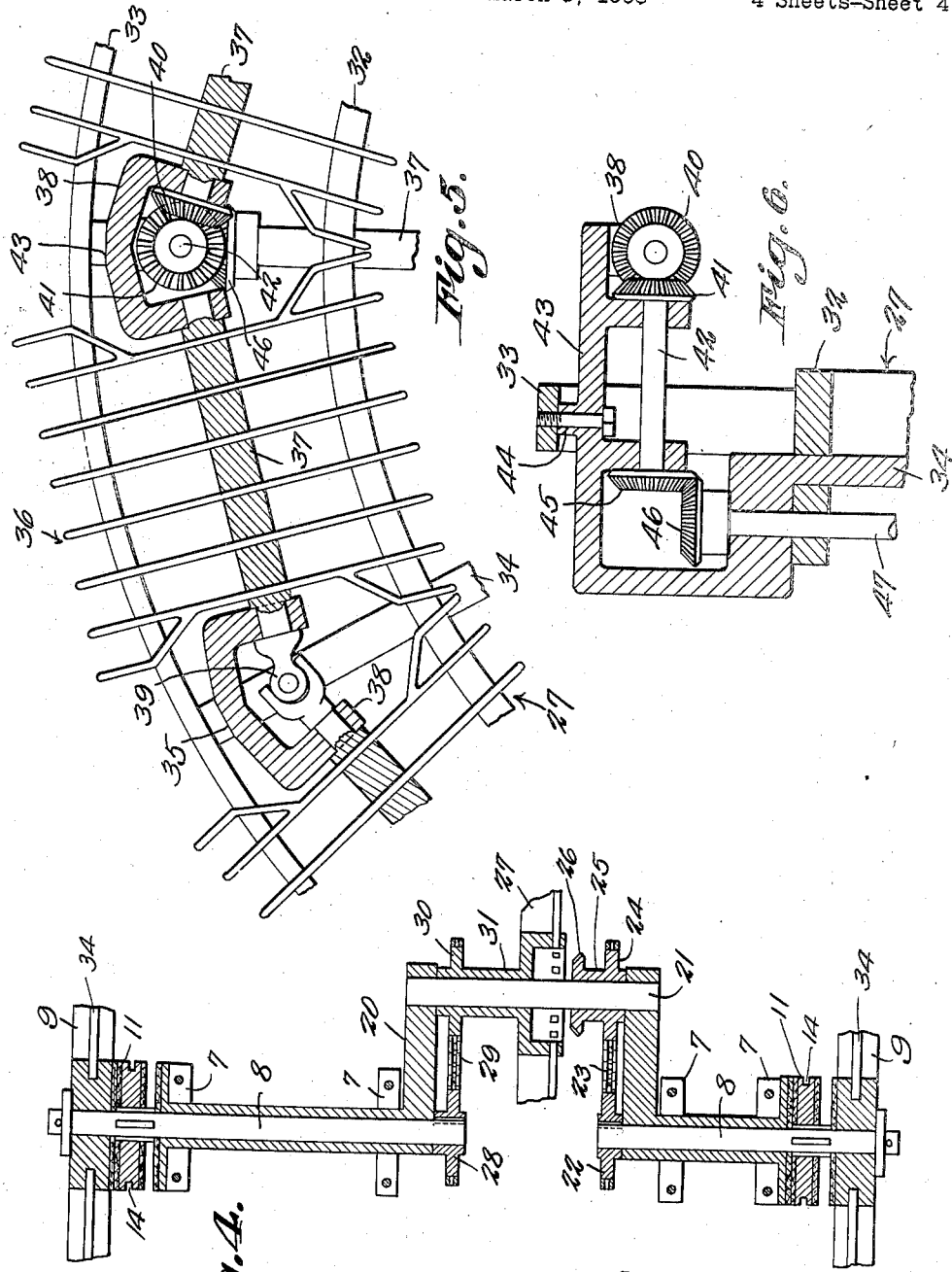

2,134,816

UNITED STATES PATENT OFFICE 2,134,816

THINNING AND WEEDING MACHINE

Andy M. Fetters, Payette, Idaho

Application March 8, 1938, Serial No. 194,681

10 Claims. (Cl. 97—12)

This invention relates to agricultural machines, and more particularly to machines designed for thinning rows of growing plants.

An object of the invention is to provide a thinning machine of this character which may be moved along rows of plants, the construction of the machine being such as to remove growing plants or weeds from the rows, leaving growing plants spaced predetermined distances apart.

Another object of the invention is to provide means whereby the rotating wheel which carries the thinning teeth, may be held stationary while the teeth are rotated, to the end that the device may be used in removing all of the plants of a row.

A still further object of the invention is to provide a rotary thinning wheel and means for mounting the thinning wheel so that the wheel may be adjusted vertically with respect to the ground surface, thereby regulating the depth of operation of the teeth of the thinning wheel.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a longitudinal sectional view through the machine, the entire thinning wheel having been omitted for the sake of clearness.

Figure 3 is an enlarged detail view illustrating the construction of the thinning wheel and thinning teeth carried thereby.

Figure 4 is a fragmental sectional view through the rear axle housings of the machine, and illustrating the clutch members employed for clutching the wheels of the machine to the axles.

Figure 5 is an enlarged fragmental view illustrating the detail construction of the thinning teeth and means for operating the thinning teeth.

Figure 6 is a fragmental sectional view illustrating the means for rotating the thinning teeth.

Figure 1:
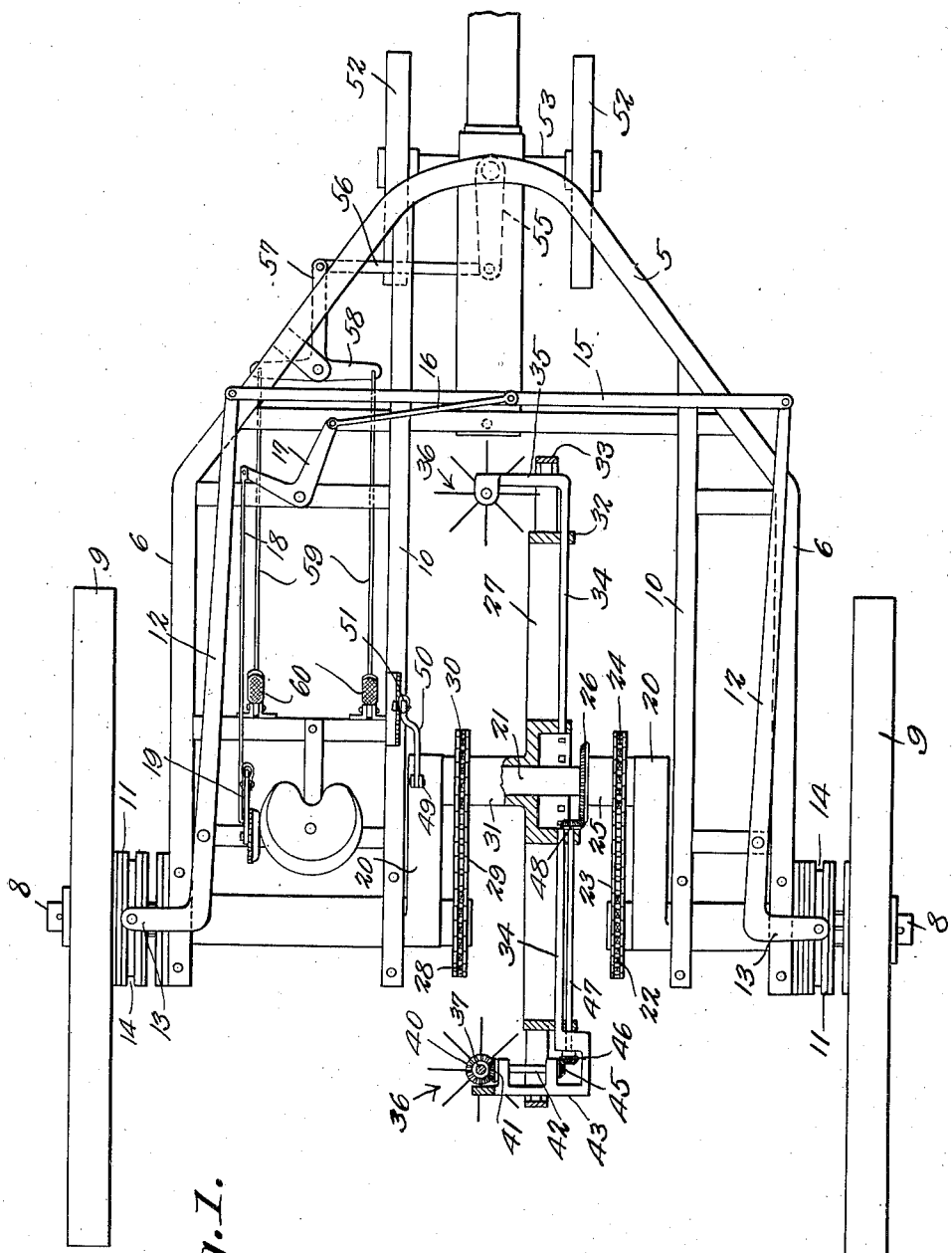
Figure 1 is a plan view of a thinning machine constructed in accordance with the invention showing the thinning wheel in section with all but two thinning members omitted.

Referring to the drawings in detail, the frame of the machine is indicated generally by the reference character 5, and includes side rails 6 that support bearings 7, at the rear ends thereof, the bearings 7 accommodating the axles 8 on which the supporting wheels 9 are loosely mounted.

Arranged in parallel spaced relation with the side rails 6, are the rails 10, which also form a part of the frame, the rails 10 providing supports for bearings in which the inner ends of the axles 8 are mounted.

Splined on the axles 8, are clutch members 11 that are adapted to move into engagement with the supporting wheels 9, clutching the wheels 9 to the axles 8, at the will of the operator. Connected with each of the clutch members 11, is a lever 12 pivotally mounted on the frame of the machine, the levers 12 having right angled end portions 13 that carry pins which move in the grooves 14 of the clutch members 11. The free ends of the levers 12 are connected by the bar 15, the connection between the levers 12 and bar 15 being such that when the bar 15 is moved transversely of the frame, one of the clutch members will be moved to clutch one of the supporting wheels to its axle, while the opposite clutch member will be moved to a position disengaging the supporting wheel associated therewith.

Connected to the bar 15 at a point substantially intermediate its ends, is a link 16 that has pivotal connection with one end of the bell-crank lever 17 which is pivotally mounted on the frame of the machine, the opposite end of the bell-crank lever 17 being connected with the rod 18 which extends to the lever 19 where it is connected therewith. Thus it will be seen that due to this construction, the bar 15 and levers 12 may be operated by moving the lever 19.

As clearly shown by Figure 1 of the drawings, the axles 8 extend through bearing openings in the arms 20 which are horizontally disposed and extend forwardly within the frame, the arms 20 providing supports for the shaft 21. Mounted on the inner end of the axle 8 at one side of the machine, is a sprocket 22 over which the chain 23 operates, the chain 23 also operating over the sprocket 24 secured at one end of the sleeve 25 that carries the beveled pinion 26 on its inner end. Thus it will be seen that due to this construction, rotary movement is transmitted to the sleeve 25 and beveled gear 26, through the medium of the axle 8, sprockets 22 and 24 and chain 23.

The wheel which supports the thinning teeth of the machine, is indicated by the reference character 27 and is mounted on the shaft 21.

Secured to the inner end of the axle 8 at the opposite side of the machine, is a sprocket 28 over which the chain 29 operates, the chain 29 also operating over the sprocket 30 formed on one end of the hub 31, forming a part of the wheel 27. When the supporting wheel 9 at this side of the machine, is placed in motion, it will be seen that rotary movement will be transmitted to the wheel 27, through the chain 29. The wheel 27 embodies spaced ring members 32 and 33, held in spaced relation with the hub 31, by means of the spokes 34 which are shown as secured to the hub 31, and extended through openings in the ring member 32, the outer ends of the spokes 34 being extended laterally providing supporting arms 35 for the rotary thinning members 36. These rotary thinning members 36 include shafts 37 that have their ends disposed in bearings 38, the adjacent ends of the shafts 37 being connected by the universal joints 39, so that all of the thinning members are rotated at the same time. On one end of one of the shafts 37 is a pinion 40 that meshes with the pinion 41 carried at one end of the shaft 42 that operates in bearings formed on the gear support 43, which is secured to the ring member 33, by means of the bolt 44. It will of course be understood that this gear support 43 is formed at the outer end of one of the spokes of the wheel 27. On the inner end of the shaft 42, is a pinion 45 that meshes with the pinion 46 carried at one end of the shaft 47, the shaft 47 being of a length to extend through the hub 31, where it is supplied with a pinion 48 meshing with the beveled gear 26. Thus it will be seen that due to this construction, rotary movement is transmitted to the rotary thinning members, through the chain 23, beveled gear 26 and shaft 47. It might be further stated that these thinning members include radiating teeth arranged in groups around the periphery of the wheel 27, the groups of teeth being spaced apart providing clearances around the periphery of the wheel, to the end that when the machine is moved along a row of plants, the spaces between adjacent groups of teeth will fall over certain plants of the row with the result that these plants will remain standing and will not be removed by the rotary wheel 27.

Connected with the arm 20 at one side of the frame of the machine, is a pivoted link 49 to which the arm 50 of the lever 51 is connected, so that by moving the lever 51, the shaft 21, together with the wheel 27 mounted thereon, may be moved vertically with respect to the ground surface, thereby regulating the depth of operation of the teeth of the rotary thinning members 36.

The forward end of the machine is supported by the wheels 52 that are mounted on the axle 53 which is mounted on the frame 54. This frame 54 is pivotally mounted at the forward end of the machine and is provided with an arm 55 extending therefrom. Connected with the arm 55 is a link 56 that extends laterally of the frame of the machine and has connection with the arm 57 carrying the cross arm 58 at its inner end. Rods 59 are connected with the cross arm 58, and have connection with the treadles 60 disposed adjacent to the operator's seat, whereby the operator may by forcing the pedals 60 downwardly, move the frame 54 and wheels 52, to guide the machine.

In the operation of the machine, the machine is positioned to straddle a row of growing plants to be thinned. The lever 19 is now operated to move the clutch members to positions as shown by Figure 1 of the drawings, whereupon rotary movement is transmitted from the wheel 9 at one side of the machine, to the axle 8 carrying the sprocket 28. Sprocket 28 is now rotated which in turn transmits movement to the wheel 27, through the chain 29, sprocket 30 and hub 31. As the wheel 27 rotates, the rotary movement of the wheel 27 around the beveled gear 26, causes rotary movement to be imparted to the several rotary thinning members, through the pinion 48 and shaft 47. As these rotary thinning members contact with the growing plant, it is obvious that the teeth thereof will dig certain of the plants from the ground surface, leaving growing plants spaced predetermined distances apart.

Should it be desired to remove all of the plants of a row, the lever 19 is moved in the opposite direction, whereupon the clutch member at the opposite side of the machine is moved into engagement with the wheel associated therewith, simultaneously disengaging the clutch member at the opposite side of the machine, and releasing the sprocket 28. When the clutch members are in this position, it is obvious that the wheel 27 will be held against rotary movement, and that rotary movement will be imparted to the rotary thinning members, through the sprocket 22, chain 23, sprocket 24, beveled gear 26, shaft 47, pinions 45 and 46, shafts 42, and pinions 40 and 41.

I claim:

1. In a machine of the class described, a wheel-supported frame, a thinning wheel mounted within the frame, a plurality of rotary thinning members mounted on the wheel, means for operating the thinning wheel and thinning members simultaneously, and means for holding the thinning wheel against rotary movement and rotating the thinning members.

2. In a machine of the class described, a wheel-supported frame, a rotary thinning wheel mounted on the frame, a plurality of rotary thinning members mounted adjacent to the periphery of the wheel and rotating in planes at right angles to the plane of the wheel, means for rotating the thinning wheel and thinning members simultaneously, and means whereby the thinning wheel may be held against rotation and said thinning members rotated.

3. In a machine of the class described, a wheel-supported frame, a thinning wheel mounted for rotary movement on the frame and in the direction of travel of the frame, a plurality of rotary thinning members mounted on the thinning wheel adjacent to the periphery thereof, said thinning members being spaced apart, the spaces between the thinning members accommodating plants of the row through which the machine moves, whereby certain plants are left standing in the row, means for rotating the thinning wheel and thinning members, and said thinning members adapted to rotate in a plane at right angles to the direction of rotation of the thinning wheel.

4. In a machine of the class described, a wheel-supported frame, a thinning wheel mounted for rotary movement on the frame, a plurality of rotary thinning members mounted on the wheel, the adjacent ends of said thinning members being spaced apart providing spaces whereby the thinning members pass over plants in a row of plants being thinned, leaving certain growing plants in the row, teeth forming a part of each thinning member, said teeth extending beyond the periphery of the thinning wheel to contact with plants in the row, and means for rotating the thinning wheel and thinning members.

5. In a machine of the class described, a wheel-supported frame, a rotary thinning wheel mounted within the frame, rotary thinning members carried by the wheel, teeth formed on the rotary thinning members and operating adjacent to the periphery of the thinning wheel whereby the teeth will contact with growing plants in the row of plants being thinned, means for rotating the thinning wheel and the thinning members, and means for adjusting the thinning wheel vertically, regulating the depth of operation of the teeth of the thinning members.

6. In a machine of the class described, a wheel-supported frame, a rotary thinning wheel mounted within the frame, rotary thinning members mounted adjacent to the periphery of the thinning wheel and spaced apart, means for rotating the thinning wheel and thinning members, whereby the thinning members contact with growing plants, thinning the row of plants through which the thinning members move, the spaces between adjacent thinning members accommodating certain plants of the row, leaving the plants standing in the row, and means for adjusting the thinning wheel vertically.

7. In a machine of the class described, a wheel-supported frame, a thinning wheel mounted for rotary movement on the frame, rotary thinning members supported by the thinning wheel, teeth on the rotary thinning members and extending beyond the periphery of the wheel to contact with growing plants of a row of plants being thinned, said thinning members being spaced apart providing spaces to pass over growing plants leaving certain growing plants in the row, and means for rotating the thinning members independently of the thinning wheel.

8. In a machine of the class described, a wheel-supported frame, a thinning wheel, a horizontal shaft on the frame and on which the thinning wheel operates, rotary thinning members mounted on the wheel adjacent to the periphery thereof, and means for adjusting the shaft vertically, regulating the depth of operation of the thinning members.

9. In a machine of the class described, a wheel-supported frame, a horizontal shaft mounted on the frame, a thinning wheel mounted for rotary movement on the shaft, thinning members mounted for rotary movement on the thinning wheel, means for operating the thinning members, said operating means comprising shafts having pinions, mounted on the thinning wheel, a gear loosely mounted on the horizontal shaft and meshing with one of said pinions for rotating the thinning members simultaneously with the rotation of the thinning wheel, and said thinning member operating means adapted to rotate the thinning members when the thinning wheel is held against rotation, whereby all of the plants of a row are removed.

10. In a machine of the class described, a wheel-supported frame, a thinning wheel mounted for rotary movement on the frame, thinning members supported on the thinning wheel and mounted adjacent to the periphery thereof, said thinning members being spaced apart, the spaces between thinning members adapted to accommodate plants when the machine is moved through a row of growing plants, shafts on which the thinning members are mounted, universal connections between the shafts of the thinning members, whereby the thinning members are rotated simultaneously, means for rotating the thinning wheel, and means for adjusting the thinning wheel vertically, whereby the depth of operation of the thinning members is regulated.

ANDY M. FETTERS.